July 29, 1952

L. ANDERSON ET AL 2,604,656

HOG BEATER PADDLE

Filed Sept. 29, 1950

Inventor
LEON ANDERSON
ERNEST NASSIMBENE

*Anderson & Muller*
Attorneys

Patented July 29, 1952

2,604,656

UNITED STATES PATENT OFFICE 2,604,656

HOG BEATER PADDLE

Leon Anderson and Ernest Nassimbene, Denver, Colo., assignors to The Gates Rubber Company, Denver, Colo., a corporation of Colorado Application September 29, 1950, Serial No. 187,438

3 Claims. (Cl. 17—18)

This invention relates to hog beater paddles for use in dehairing and cleaning machines of the general type exemplified by Patent No. 1,502,749.

The principal object of the invention is to provide hog beater paddles with increased useful operative life.

Another object is to provide hog beater paddles which are reinforced in a novel manner to effect increased life thereof.

Another object is to provide hog beater paddles having improved flexure characteristics and in which stresses are reduced and more uniformly distributed throughout their lengths.

Still further objects, advantages, and salient features will become more apparent from a consideration of the description to follow, the appended claims, and the accompanying drawing, in which:

Figure 4:
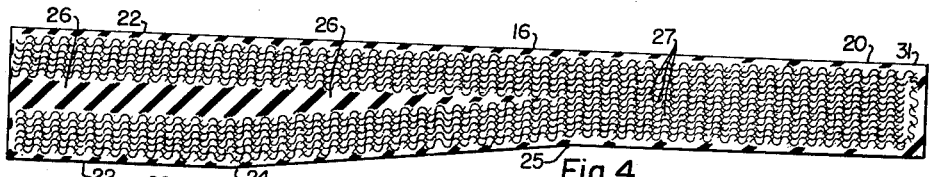
Figures 4, 4a and 4b are enlarged longitudinal sections between opposite faces of the paddle of Figure 2, taken on line 4—4, and showing various forms of the invention.

Referring to the drawing, the dehairing machine comprises a plurality of longitudinally spaced grills 11, 11 which provide a trough in which the hog 12 may roll as the paddles 13 engage same, the paddles being mounted on arms 14 of a suitable rotor 15, all as understood in the art and as more fully disclosed in the patent previously identified.

Figure 3:
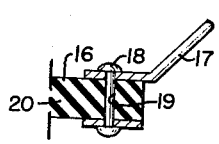
Figure 3 is a section taken on line 3—3, Figure 2.
Figure 2:
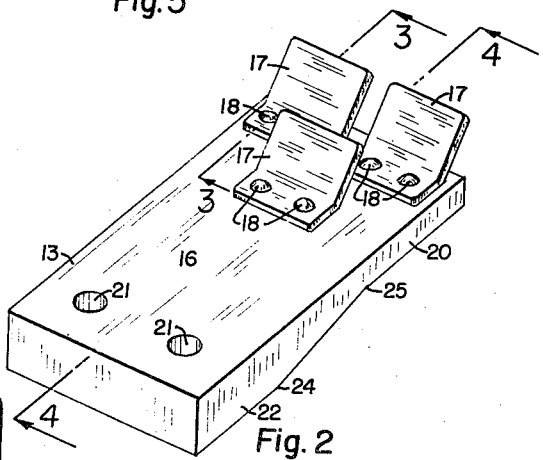
Figure 2 is a perspective of a paddle which constitutes the subject of the invention.
Figure 1:
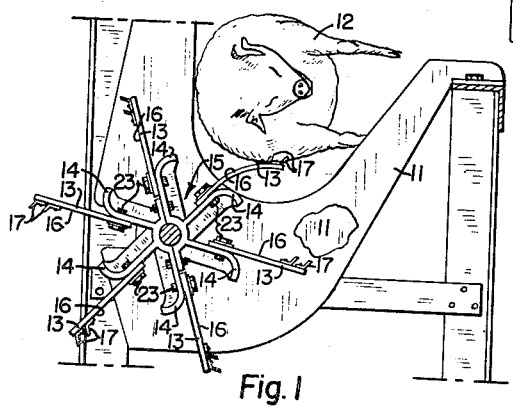
Figure 1 is a transverse section through a conventional dehairing machine which may employ paddles of the type to which the invention relates.

Referring to Figures 2 and 3, the paddle 13 comprises a rubber-like body having a flat leading face 16 to which is secured a plurality of dehairing scraper knives 17 by rivets 18 extending through apertures 19 in the tip or outer end 20 of the paddle. A pair of apertures 21 extend through the base 22 of the paddle through which bolts 23 extend to secure the paddle to an arm 14, the foregoing construction also being conventional and well-known in the art.

Figure 4A:
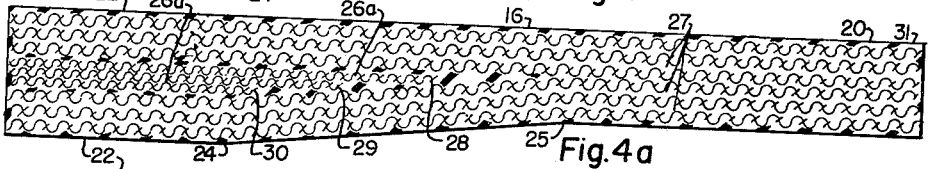
Figure 4B:
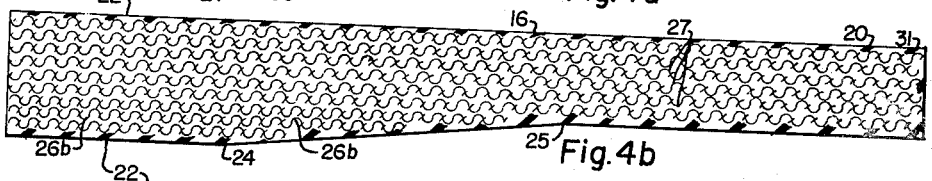

Referring to Figures 4, 4a and 4b, it will be observed that base 22 is thicker than tip 20 and the paddles taper in thickness between points 24 and 25, this being effected by a wedge 26, 26a, 26b, respectively, disposed between opposite faces of the paddles.

In Figure 4 the paddle is reinforced with a plurality of layers 27 of fabric. These layers are parallel in the tip portion 20 and base portion 22 but diverge from parallel relationship between points 24 and 25, this being effected by wedge 26. Wedge 26 is an integral mass of rubber-like material such as gum rubber, preferably of relatively high modulus, and which may contain, if desired, filler materials such as linters, cork, or the like.

In Figure 4a the construction is substantially the same as in Figure 4 except that wedge 26a is formed of a plurality of layers of fabric which are stepped, ends of the various layers being shown at 28, 29, 30.

In Figure 4b, the wedge 26b is formed of stepped layers of fabric as in Figure 4a, but is disposed at one side of layers 27 which are parallel throughout the length of the paddle.

Figure 5:
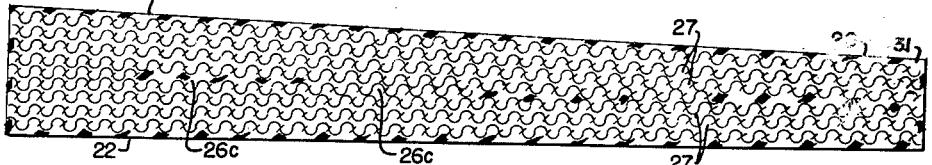
Figure 5 is a section similar to Figure 4 showing another form of the invention.

In Figure 5, both sides of the paddle are flat and the wedge 26c is formed by stepping the fabric in a manner similar to Figures 4a and 4b, thus providing a base portion 22 which is thicker than tip portion 20.

The reinforcing material may be any of the materials commonly employed in the rubber art such as square or bias cut fabric woven of cotton, nylon, rayon, etc., which may be skim coated or frictioned, or cords or cord fabric, wire, spun glass, or any combination thereof, the invention in its broadest aspects not being limited to any particular reinforcing material.

A cover 31, which may be of any form of rubber-like material, is applied to the outer surface of the assembled paddles, after which they are vulcanized under heat and pressure in a suitable mold.

Having described the invention, what we claim as new is:

1. In an elongated hog beater paddle having a base portion adjacent an inner end thereof adapted to be secured to a rotor of a hog dehairing machine, and having a tip portion adjacent the outer end adapted to carry a scraper member, the improvement wherein said paddle is reinforced therewithin by two sets of layers of fabric-like material extending substantially between the outer and inner ends of the paddle, said sets being disposed in superposed and parallel relation from adjacent said outer end to a point intermediate said tip and base portions, at which point the sets diverge and are disposed in spaced apart relation in a region extending to substantially the inner end of the paddle, and a body of rubber-like material disposed between said sets in said region.

2. A paddle in accordance with claim 1 wherein said body is resilient rubber.

3. A paddle in accordance with claim 1 wherein said body is fabric-like material.

LEON ANDERSON.
ERNEST NASSIMBENE.

REFERENCES CITED

The following references are of record in the file of this patent:

UNITED STATES PATENTS

| Number | Name | Date |
|---|---|---|
| 1,213,717 | Wenzel | Jan. 23, 1917 |
| 2,029,064 | Edwards | Jan. 28, 1936 |
| 2,296,873 | Rachford | Sept. 29, 1942 |

FOREIGN PATENTS

| Number | Country | Date |
|---|---|---|
| 116,500 | Australia | Jan. 27 1943 |